US010576439B2

(12) United States Patent
Xu

(10) Patent No.: US 10,576,439 B2
(45) Date of Patent: Mar. 3, 2020

(54) SCALE COLLECTION DEVICE FOR DOWNFLOW REACTORS

(71) Applicant: UOP LLC, Des Plaines, IL (US)

(72) Inventor: Zhanping Xu, Inverness, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 16/221,157

(22) Filed: Dec. 14, 2018

(65) Prior Publication Data

US 2019/0193039 A1 Jun. 27, 2019

Related U.S. Application Data

(60) Provisional application No. 62/609,307, filed on Dec. 21, 2017.

(51) Int. Cl.
B01J 8/00 (2006.01)
B01D 24/22 (2006.01)
B01D 29/25 (2006.01)
B01D 24/12 (2006.01)

(52) U.S. Cl.
CPC ............ *B01J 8/0085* (2013.01); *B01D 24/12* (2013.01); *B01J 8/006* (2013.01); *B01D 2101/00* (2013.01); *B01J 2204/002* (2013.01)

(58) Field of Classification Search
CPC .... B01J 8/0085; B01J 8/006; B01J 2204/002; B01D 24/12; B01D 2101/00; B01D 36/001; B01D 24/22; B01D 29/25
USPC ........................................................ 422/187
See application file for complete search history.

(56) References Cited

U.S. PATENT DOCUMENTS

| 3,607,000 | A | 9/1971 | Beal et al. |
| 4,380,529 | A | 4/1983 | Gupta |
| 4,836,989 | A * | 6/1989 | Aly ..................... B01J 8/0453 202/158 |
| 5,484,578 | A | 1/1996 | Muldowney et al. |
| 8,181,942 | B2 | 5/2012 | Sechrist |
| 8,487,151 | B2 | 7/2013 | Koudil et al. |
| 8,673,246 | B2 | 3/2014 | Chen et al. |
| 9,364,810 | B2 | 6/2016 | Merkel et al. |
| 9,480,957 | B2 * | 11/2016 | Bazer-Bachi ......... B01J 8/0492 |
| 2011/0201856 | A1 * | 8/2011 | Cottard .................... B01J 8/006 585/250 |

(Continued)

FOREIGN PATENT DOCUMENTS

CN 103131472 A 6/2013
WO 2006076923 A1 7/2006

(Continued)

OTHER PUBLICATIONS

International Search Report and Written Opinion from corresponding PCT Application No. PCT/US2018/066666, dated Apr. 4, 2019.

(Continued)

Primary Examiner — Huy Tram Nguyen

(57) ABSTRACT

The invention involves a scale collection device that is located within downflow reactor head for removing solids from feed streams to increase reactor operating cycle time without impact on effective reactor space for catalyst loading. More particularly, a filtering zone is located in an upper portion of a reactor vessel above a rough liquid distribution tray and a distribution tray.

19 Claims, 1 Drawing Sheet

(56) References Cited

U.S. PATENT DOCUMENTS

2017/0015917 A1   1/2017   Muller

FOREIGN PATENT DOCUMENTS

WO    2007023225 A1    3/2007
WO    2015036066 A1    3/2015

OTHER PUBLICATIONS

International Search Report and Written Opinion from corresponding PCT Application No. PCT/US2018/066659, dated Mar. 28, 2019.
International Search Report and Written Opinion from corresponding PCT Application No. PCT/US2018/066684, dated Mar. 21, 2019.
International Search Report and Written Opinion from corresponding PCT Application No. PCT/US2018/066663, dated Mar. 28, 2019.
International Search Report and Written Opinion from corresponding PCT Application No. PCT/US2018/066678, dated Apr. 4, 2019.
International Search Report and Written Opinion from corresponding PCT Application No. PCT/US2018/066682, dated Apr. 4, 2019.

* cited by examiner

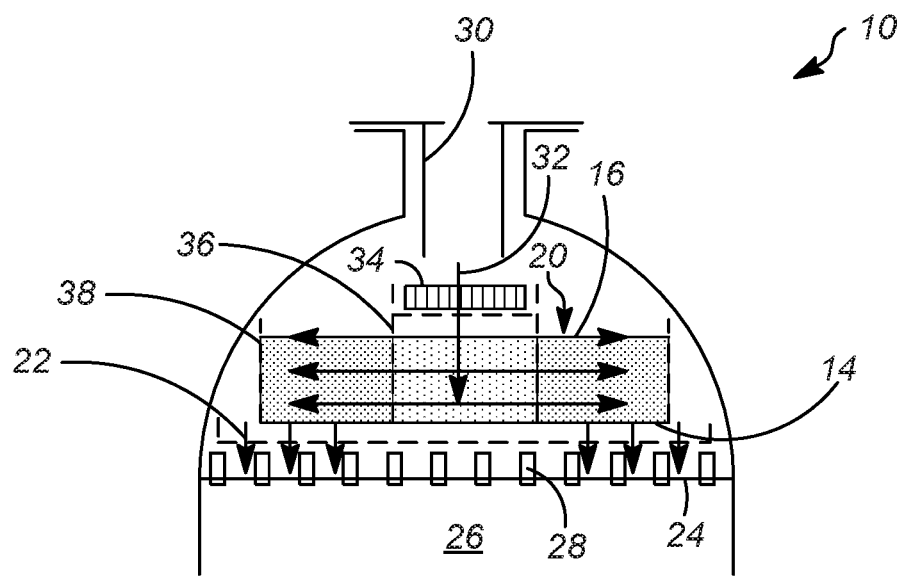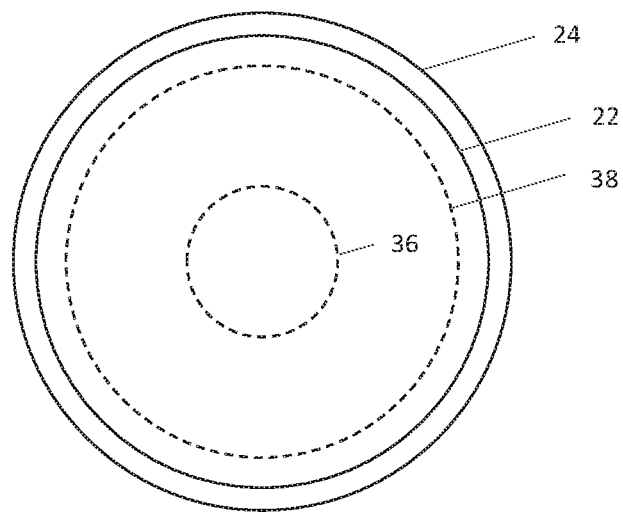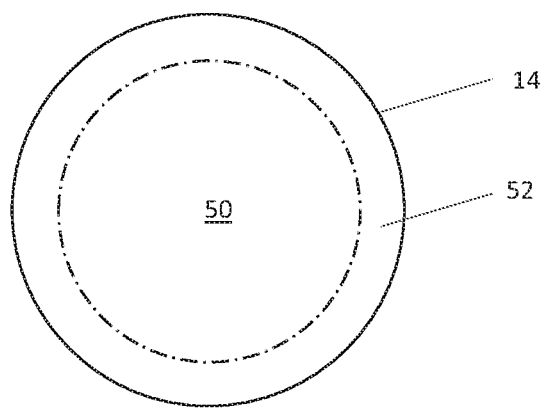

SCALE COLLECTION DEVICE FOR DOWNFLOW REACTORS

CROSS-REFERENCE TO RELATED APPLICATION

This application claims priority from U.S. Provisional Application No. 62/609,307 filed Dec. 21, 2017, the contents of which cited application are hereby incorporated by reference in its entirety.

FIELD OF THE INVENTION

The invention relates to a device for improved operation of downflow reactors. More particularly, the invention involves a scale collection device that is located within downflow reactor head for removing solids from feed streams to increase reactor operating cycle time without impact on effective reactor space for catalyst loading.

BACKGROUND OF THE INVENTION

In downflow reactors, such as downflow reactors, a layer of filtering material is often placed on top of the first catalyst bed to catch particles such as fines and scales. Typically, this layer may be 6 to 36 inches thick and reduces the space available for the catalyst to take up. In addition, the filtering material has to be removed and replaced within an operating cycle when solids accumulates within the layer of filtering material or between the filtering material and catalyst bed causing high pressure drop.

SUMMARY OF THE INVENTION

The invention involves a reactor comprising an upper portion and a lower portion wherein the upper portion contains a scale collection device. A filtering zone is located above a rough liquid distribution tray and wherein a vapor-liquid distribution tray is located below said rough liquid distribution tray and wherein the lower portion contains a catalyst bed. The filtering zone may comprise a single layer or multiple layers of filtering materials having the same or different physical and chemical properties. The filtering zone contains porous ceramic pellets or other materials that achieve a similar function. The filtering zone may be spaced above the rough liquid distribution tray by a plurality of spacers.

BRIEF DESCRIPTION OF THE DRAWING

The FIGURE shows the upper portion of a reactor showing filtering material located above the distribution trays.

DETAILED DESCRIPTION OF THE INVENTION

It has now been found that a different arrangement is preferred to filter particles from a feed stream in a downflow reactor. In addition to having a layer of filtering material on top of the catalyst, it has been found advantageous to include a layer of filtering material in the upper portion of the reactor above the distribution trays. More particularly, a scale collection device is located within an upper portion of a downflow reactor or reactor head for removing solids from feed streams and to increase reactor operating cycle time without any impact on the amount of effective reactor space for catalyst loading. This is achieved by a specially designed scale collection device located within a reactor head. As shown in the FIGURE, the scale collection device is constructed with a cylindrical side wall and a packed bed support plate at bottom spaced a small distance above a rough liquid distribution tray (RLDT). A filtering material fills the space above packed bed support plate and inside the cylindrical side wall. There may be a hold-down grid at top of the filtering material to keep it from moving around. The cylindrical side wall has perforations or slots for liquid to pass through. The top of cylindrical side wall is notched for controlling liquid overflow around the top of the wall in case that the filter bed is plugged with solids restricting liquid flow through the bed. The liquid out of the scale collection device is intercepted by a larger-diameter rough liquid distribution tray below for redistributing liquid across the tray to a vapor-liquid distribution tray below.

Gas and liquid enter the reactor through an inlet nozzle. The liquid is distributed to a central zone of the scale collection device, flows radially outward through the filtering material and exits the device through perforations on the cylindrical side wall or part of the bottom plate near the cylindrical wall. The liquid out of the scale collection device is intercepted by the larger-diameter RLDT below for redistribution to the underneath vapor-liquid distribution tray. Gas is separated from liquid in the space between the inlet nozzle and top of the scale collection device- and flows down through an open annular area between the cylindrical side wall and reactor head. With gas bypassing the filtering material, the pressure drop will not increase even with the filtering material filled with solids.

With this design, the reactor cycle time can be increased by the additional filter bed within top reactor head or catalyst loading increased by reducing the filter material on top of the catalyst bed.

The liquid out of the scale collection device is redistributed by the rough liquid distribution tray below. Gas and liquid are then distributed through a vapor-liquid distribution tray in fluid communication with the rough liquid distribution tray to the catalyst bed. The rough distribution tray includes an upper liquid retention baffle.

As shown in the FIGURE, according to one or more embodiments of the present invention, in order to remove the scales and fines in a liquid stream from within reactor 10 is shown an outer reactor shell having a rounded upper portion. The lower portion of reactor 10 contains a catalyst bed 26. A filtering zone 16 is shown on top of packed bed support plate 14. The packed bed support plate 14 is located a small distance above rough liquid distribution tray 22 that has a series of openings. The packed bed support plate 14 is attached or welded with the cylindrical side wall 38 for supporting filtering material in filtering zone 16. The packed bed support plate 14 is mostly closed so that liquid is forced to flow radially outwards through the filtering material and exits through perforations on the cylindrical side wall 38 or part of the bottom plate close to the cylindrical side wall 38 to the rough liquid distribution tray 22. The top of cylindrical side wall 38 of the filtering zone 16 has openings, such as triangular or rectangular openings for liquid overflow in the event that the filtering bed is plugged by solids. The liquid then passes down from rough liquid distribution tray 22 to a vapor-liquid distribution tray 24 that is shown as having a number of distributors 28. Gas and liquid then pass below into catalyst bed 26. The scale collection device 20, rough liquid distribution tray 22 and the vapor-liquid distribution tray 24 may be supported by a set of double-truss beams seating on the support ring attached to reactor shell.

The scale collection device 20 includes cylindrical side wall 38, packed bed support plate 14, and filtering material.

The reactor includes an inlet nozzle 30. Gas and liquid enter into reactor 10 through the inlet nozzle 30. The inlet flow stream 32 is straightened vertically downwards by the orifice plate at top of the nozzle 30. Gas is separated from liquid in the space between the bottom of the nozzle 30 and top of the momentum damping grid/plate 34 on top of the central basket 36. The liquid flows mostly downward through the central basket 36 first and then radially outwards through the filtering material in the annual basket until reaching the open part of the bottom plate and the perforated cylindrical side wall where the liquid starts to flow downward the lower rough liquid distribution tray 22. If the porous media in the lower part of the baskets is plugged by solids, the liquid flow gradually moves up through the porous media until the entire solid bed is plugged at which liquid will flow over top of the cylindrical side wall 38 into the rough liquid distribution tray 24 without passing through porous media.

The openings on the cylindrical side wall and bottom plate of the scale collection device can be designed such that the scale collection device is operated with partial full or full of liquid. The open areas along the vertical cylindrical side wall can be varied (e.g. increasing from bottom to top due to reduced driving force for liquid flows) so that the amount of liquid discharged along the side wall at each horizontal slice around the wall and the liquid horizontal flow velocities through the filter material along the vertical direction are about the same for maximum solid removal efficiency.

The packed bed catches solids without a dedicated fluid distribution system at top of the bed. The gradual decrease of liquid flow velocities in the radial direction facilitates the capture of fine particles before liquid is out of the scale collection device from the openings on the bottom plate or the outer cylinder wall. It is preferred that the bottom plate is closed for at least one foot from the inner cylinder so that liquid has to flow at least one foot through the porous media in the annular bed before it is out of the scale collection device. When the scale collection device is not operating with full of liquid and the filtering material in contacting with liquid flows is plugged, it is expected that liquid flows move up through the filter material and the openings on the side cylinder wall down to the rough liquid distribution tray.

The filter material used in the filtering zone may comprise pellets, sheets or other configuration of a porous material as known in the art. Preferred materials for the filtering zone are ceramic pellets which have a high internal porosity, such as the products available from Crystaphase Technologies, Inc., located in Houston, Tex. USA. Other filtering materials may be used, for example, membrane filters, sand filters, and other similar filter materials. In accordance with a preferred embodiment, the filtering zone contains one or multiple layers of filter materials with the same or different physical and chemical properties. The packed bed support plate or packed bed support plate with a wire mesh sheet above, upon which the porous material is supported has openings that are smaller than the size of the porous material pellets or other configuration. More open filtering material or filter material with large internal pores may be placed within the central basket 36 to capturing large particulates or scales and filtering material with smaller internal pores in the annular basket for removing fine particles.

In another embodiment, the porous media may be placed directed on the rough liquid distribution tray. The open support grid may be placed on an annular zone inside the outer cylinder between the packed bed and the rough liquid distribution tray so that liquid can flow downward through the openings on rough liquid distribution.

With respect to the collection of the solid materials from the liquid, the configuration also reduces the tendency of rough liquid distribution tray 22, and vapor-liquid distribution tray 24 being plugged by solids. The quality of liquid distribution through the rough liquid distribution tray 22 and vapor-liquid distribution tray 24 was also found improved due to the reduced turbulent of liquid on the rough liquid distribution tray by the scale collection device above the rough liquid distribution tray 22.

As illustrated in the FIGURE, the cross-sectional view of the packed bed support plate illustrates no openings in middle portion 50 of the support plate 14 and optional openings in an outer ring 52 adjacent to cylindrical side wall for liquid flow.

Specific Embodiments

While the following is described in conjunction with specific embodiments, it will be understood that this description is intended to illustrate and not limit the scope of the preceding description and the appended claims.

A first embodiment of the invention is an apparatus comprising an upper portion and a lower portion wherein the upper portion contains an inlet nozzle and a scale collection device wherein a filtering zone is located above a rough liquid distribution tray and wherein a vapor-liquid distribution tray is located below the rough liquid distribution tray. An embodiment of the invention is one, any or all of prior embodiments in this paragraph up through the first embodiment in this paragraph, wherein the lower portion contains a catalyst bed. An embodiment of the invention is one, any or all of prior embodiments in this paragraph up through the first embodiment in this paragraph, wherein the lower portion contains a medium. An embodiment of the invention is one, any or all of prior embodiments in this paragraph up through the first embodiment in this paragraph, wherein the lower portion contains a packing. An embodiment of the invention is one, any or all of prior embodiments in this paragraph up through the first embodiment in this paragraph, wherein the filtering zone comprises one layer of filtering material having the same physical and chemical properties. An embodiment of the invention is one, any or all of prior embodiments in this paragraph up through the first embodiment in this paragraph, wherein the filtering zone comprises multiple layers of filtering material having different physical and chemical properties. An embodiment of the invention is one, any or all of prior embodiments in this paragraph up through the first embodiment in this paragraph, wherein the filtering zone comprises porous ceramic pellets. An embodiment of the invention is one, any or all of prior embodiments in this paragraph up through the first embodiment in this paragraph, wherein a packed bed support plat is space above the rough liquid distribution tray. An embodiment of the invention is one, any or all of prior embodiments in this paragraph up through the first embodiment in this paragraph, wherein the packed bed support plate includes annular perforations for liquid flow. An embodiment of the invention is one, any or all of prior embodiments in this paragraph up through the first embodiment in this paragraph, wherein the vapor-liquid distribution tray comprises a plurality of distributors. An embodiment of the invention is one, any or all of prior embodiments in this paragraph up through the first embodiment in this paragraph, wherein the rough liquid distribution tray contains holes sized to generate the desired liquid level on the rough liquid distribution tray.

A second embodiment of the invention is an apparatus comprising an upper portion and a lower portion wherein the upper portion contains an inlet nozzle and a scale collection device wherein a filtering zone is located above a rough liquid distribution tray and wherein a vapor-liquid distribution tray is located below the rough liquid distribution tray, wherein the vapor-liquid distribution tray comprise a plurality of distributors, and wherein the lower portion contains a catalyst bed. An embodiment of the invention is one, any or all of prior embodiments in this paragraph up through the second embodiment in this paragraph, wherein the rough liquid distribution tray contains holes sized to generate the desired liquid level on the rough liquid distribution tray.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A reactor comprising an upper portion and a lower portion wherein the upper portion comprises:
   an inlet nozzle;
   a rough liquid distribution tray comprising a cylindrical wall spaced apart from a reactor wall and a perforated bottom plate;
   a scale collection device comprising a cylindrical sidewall and a support plate defining a filtering zone, the support plate having a solid middle portion, wherein the scale collection device is spaced above the rough liquid distribution tray;
   a central basket in the filtering zone having a porous sidewall; and
   a vapor-liquid distribution tray located below the rough liquid distribution tray.

2. The reactor of claim 1, wherein the lower portion contains a catalyst bed.

3. The reactor of claim 1, wherein the lower portion contains a medium.

4. The reactor of claim 1, wherein the lower portion contains a packing.

5. The reactor of claim 1, wherein the filtering zone comprises one layer of filtering material having the same physical and chemical properties.

6. The reactor of claim 1, wherein the filtering zone comprises multiple layers of filtering material having different physical and chemical properties.

7. The reactor of claim 1, wherein the filtering zone comprises porous ceramic pellets.

8. The reactor of claim 1, wherein a packed bed support plat is space above the rough liquid distribution tray.

9. The reactor of claim 8, wherein the packed bed support plate includes annular perforations for liquid flow.

10. The reactor of claim 1, wherein the vapor-liquid distribution tray comprises a plurality of distributors.

11. The reactor of claim 1, wherein the rough liquid distribution tray contains holes sized to generate the desired liquid level on the rough liquid distribution tray.

12. The reactor of claim 1 wherein the support plate has an outer ring having openings therethrough.

13. The reactor of claim 1 wherein the central basket has a momentum damping grid/plate on top.

14. An apparatus comprising an upper portion and a lower portion wherein the upper portion comprises:
   an inlet nozzle;
   a rough liquid distribution tray comprising a cylindrical wall spaced apart from a reactor wall and a perforated bottom plate;
   a scale collection device comprising a cylindrical sidewall and a support plate defining a filtering zone, the support plate having a solid middle portion, wherein the scale collection device is spaced above the rough liquid distribution tray;
   a central basket in the filtering zone having a porous sidewall;
   a vapor-liquid distribution tray located below the rough liquid distribution tray, wherein the vapor-liquid distribution tray comprises a plurality of distributors; and
   wherein the lower portion contains a catalyst bed.

15. The apparatus of claim 14, wherein the rough liquid distribution tray contains holes sized to generate the desired liquid level on the rough liquid distribution tray.

16. The reactor of claim 14 wherein the support plate is solid.

17. The reactor of claim 14 wherein the support plate has an outer ring having openings therethrough.

18. The reactor of claim 14 wherein the central basket has a momentum damping grid/plate on top.

19. The reactor of claim 1 wherein the support plate is solid.

* * * * *